US011114959B2

(12) United States Patent
Oka et al.

(10) Patent No.: US 11,114,959 B2
(45) Date of Patent: Sep. 7, 2021

(54) ELECTRIC MOTOR DRIVING SYSTEM AND METHOD

(71) Applicants: DENSO CORPORATION, Kariya (JP); TOYOTA JIDOSHA KABUSHIKI KAISHA, Toyota (JP)

(72) Inventors: Haruka Oka, Kariya (JP); Ryuji Omata, Kariya (JP); Kiyotaka Matsubara, Ichinomiya (JP); Makoto Nakamura, Okazaki (JP); Daigo Nobe, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 16/360,531

(22) Filed: Mar. 21, 2019

(65) Prior Publication Data
US 2019/0296663 A1 Sep. 26, 2019

(30) Foreign Application Priority Data

Mar. 22, 2018 (JP) .............................. JP2018-054563

(51) Int. Cl.
*H02P 4/00* (2006.01)
*H02M 7/5387* (2007.01)
*B60L 15/02* (2006.01)
*B60L 58/40* (2019.01)

(52) U.S. Cl.
CPC ............ *H02P 4/00* (2013.01); *H02M 7/5387* (2013.01); *B60L 15/025* (2013.01); *B60L 58/40* (2019.02); *B60L 2220/12* (2013.01)

(58) Field of Classification Search
USPC .................................... 318/800, 801, 400.02
See application file for complete search history.

(56) References Cited

U.S. PATENT DOCUMENTS

| 6,242,884 B1 * | 6/2001 | Lipo ......................... H02P 3/18 318/496 |
| 2006/0051081 A1 | 3/2006 | Ogino |
| 2006/0164028 A1 * | 7/2006 | Welchko ............... B60L 15/025 318/105 |

(Continued)

FOREIGN PATENT DOCUMENTS

| JP | 2000-125411 A | 4/2000 |
| JP | 2000-324871 A | 11/2000 |
| JP | 3352182 B2 | 12/2002 |

*Primary Examiner* — Jorge L Carrasquillo
(74) *Attorney, Agent, or Firm* — Oliff PLC

(57) ABSTRACT

In a so-called dual power source and dual inverter system, in which a pair of first and second inverters controls and drives a motor that includes multiple windings of phases each having open ends based on electric power supplied from a pair of power supplies, a motor driving system capable of appropriately allocating the electric power supplied from the pair of power supplies to the pair of inverters is provided. The motor driving system includes a pair of first and second inverter control circuits to generate a pair of first and second voltage instructions supplied to the first and second inverters based on a torque command, respectively. One of the first and second inverter control circuits includes a power controller that controls sharing of the electric power supplied from the first and second power supplies in accordance with a target electric power instruction.

6 Claims, 10 Drawing Sheets

(56) References Cited

U.S. PATENT DOCUMENTS

| | | | |
|---|---|---|---|
| 2006/0273748 A1 | 12/2006 | Yoshimoto et al. | |
| 2009/0033156 A1* | 2/2009 | Chakrabarti | B60L 58/33 307/82 |
| 2016/0329853 A1* | 11/2016 | Koseki | H02P 29/68 |
| 2018/0062556 A1* | 3/2018 | Yue | B62D 5/0463 |
| 2019/0229669 A1* | 7/2019 | Yamakawa | H02P 23/03 |
| 2019/0260324 A1* | 8/2019 | Kuramitsu | B62D 5/0484 |
| 2019/0296677 A1 | 9/2019 | Oka et al. | |

* cited by examiner

ELECTRIC MOTOR DRIVING SYSTEM AND METHOD

CROSS-REFERENCE TO RELATED APPLICATION

This patent application is based on and claims priority to Japanese Patent Application 2018-054563, filed on Mar. 22, 2018 in the Japan Patent Office, the entire disclosure of which is hereby incorporated by reference herein.

BACKGROUND

Technical Field

Embodiments of the present disclosure relate to an electric motor driving system and method that drives an electric motor by a pair of inverters.

Related Art

It is known that a pair of inverters is connected to both ends of an open winding of an alternating current (AC) motor, respectively, and drives the AC motor. For example, as discussed in Japanese Patent No. 3352182 (JP-3352182-B), an inverter system is composed of an electric circuit including a so-called dual electric power supply and dual inverter system. The so-called dual electric power supply and dual inverter system combines outputs of opposite polarities to each other issued from respective first and second inverters.

It is also known that electric power is transferred from one of a pair of direct current (DC) power supplies to the other one of the pair of DC power supplies. For example, Japanese Unexamined Patent Application Publication No. 2007-14185 (JP-2007-14185-A) discusses an electric power conversion system configured by an electric circuit having a pair of electric power supplies and a single inverter. In such an electric power conversion system, a first upper arm is connected to a fuel cell that serves as one of electric power supplies. A second upper arm is connected to a secondary cell that serves as the other one of electric power supplies. The first upper arm is connected to the second upper arm parallel to a common lower arm provided in the single inverter. An amount of electric power supplied from each of the fuel cell and the secondary battery is controlled in accordance with a target sharing amount.

However, JP-3352182-B only illustrates a basic control concept of the electric circuit with the dual electric power supply and dual inverter system and is completely absent to illustrate electric power transfer and electric power sharing between the pair of electric power supplies.

Although JP-2007-14185-A discusses a technology to transfer electric power from one of electric power supplies to the other one of the electric power supplies, it is still silent to teach that an amount of electric power shared between the inverters is changed when powering of a motor is performed and electric power is regenerated during running in a main motor driving system of a hybrid car, for example. Further, since it assumes one-way charge and discharge control, the technology of JP-2007-14185-A can neither maintain a prescribed preferable state of charge (SOC) nor avoid degradation of a cell as well when driving the car. Furthermore, to achieve such charge and discharge control, many parameters, such as dq-axes current instructions, corrected dq-axes voltage instructions, etc., are needed in addition to torque and the number of rotations in accordance with electric power. As a result, motor control becomes complex and the electric motor is unlikely to be driven steadily.

Hence, various embodiments of the present invention have been made in view of the above-described problems and an object of one embodiment of the present invention is to provide a novel electric motor driving system and method that adequately controls sharing of electric power supplied from a pair of electric power supplies between a pair of inverters in a so-called dual electric power supply and dual inverter system.

SUMMARY

Accordingly, one aspect of the present disclosure provides a novel electric motor driving system and method that controls driving of a motor that includes windings of two or more phases each having open ends by using a pair of inverters separately connected to a pair of power supplies, respectively. Specifically, the electric motor driving system includes a first inverter, a second inverter, and a main control unit.

The first inverter receives an input of a direct current electric power from the first power supply. The first inverter includes multiple switching elements correspondingly attached to first ends of the wirings, respectively. The second inverter also receives an input of a direct current electric power from the second power supply. The second inverter includes multiple switching elements correspondingly attached to second ends of the wirings opposite the first ends, respectively.

The main control unit includes a first inverter control circuit to generate a first voltage instruction supplied to the first inverter as an output voltage instruction based on a torque instruction. The main control unit also includes a second inverter control circuit to generate a second voltage instruction supplied to the second inverter as an output voltage instruction based on the torque instruction.

At least one of the first and second inverter control circuits includes an electric power controller to control sharing of electric power supplied from the first and second power supplies between the first and second inverters in accordance with a target electric power instruction (i.e., an instruction instructing the electric power controller about target electric power). Hence, according to one embodiment of the present invention, a shared amount of electric power supplied from the pair of electric power supplies (i.e., electric power of each of the electric power supplies) is controlled while supervising a SOC and voltages of the electric power supplies. Accordingly, the SOC can preferably be maintained while either preventing or reducing degradation of a battery in applicable one of the electric power supplies.

Another aspect of the present disclosure provides a novel electric motor driving system, in which one of the first and second inverter control circuits including the electric power controller is designated as a power-supervising circuit. By contrast, because it excludes the electric power controller, the other one of the first and second inverter control circuits is designated as an electric power non-supervising circuit. The electric power controller acting as the electric power supervising circuit exclusively adjusts dq-axes voltage instructions only in the electric power supervising circuit based on dq-axes voltage instructions generated in the first and second inverter control circuits.

Yet another aspect of the present disclosure provides a novel electric motor driving system, in which the electric power supervising circuit may generate the dq-axes voltage instructions by conducting feed-forward control based on a torque instruction input to the main control unit 200. The electric power non-supervising circuit may generate the dq-axes voltage instructions by conducting feedback control based on a torque instruction input to the main control unit 200.

Yet another aspect of the present disclosure provides a novel electric motor driving system, in which the electric power controller located in a circuit on a feed-forward control side adjusts a voltage instruction so that an amount of electric power shared with an inverter located on the electric power supervising circuit side becomes equivalent to the instruction about target electric power. Subsequently, when the amount of electric power of the inverter on the electric power supervising circuit side comes near the instruction about target electric power, the electric power non-supervising circuit applies feedback control while outputting a voltage instruction so that an actual torque follows a torque instruction input to the main control unit 200 in accordance with a change in electric power. As a result, an amount of electric power of the inverter on the electric power non-supervising circuit side also approaches a desired level, thereby achieving power sharing.

Yet another aspect of the present disclosure provides a novel electric motor driving system, in which a ratio between electric power amounts targeted by the first and second inverters may be employed as the instruction about target electric power so that the electric power controller can adjust dq-axes voltage instructions in the electric power supervising circuit in accordance with the ratio between the electric power amounts as targeted.

Yet another aspect of the present disclosure provides a novel electric motor driving system, in which an electric power target amount assigned to the inverter controlled by the electric power supervising circuit may also be used as the instruction about target electric power so that the electric power controller can adjust the dq-axes voltage instructions in the electric power supervising circuit in accordance with the target electric power instruction.

Yet another aspect of the present disclosure provides a novel electric motor driving system, in which the sum of electric power amounts targeted by the first and second inverters and the electric power amount targeted by one of the first and second inverters controlled by the electric power non-supervising circuit may be used as the instruction about target electric power so that the electric power controller can adjust the dq-axes voltage instructions in the electric power supervising circuit in accordance with the electric power amounts and the electric power amount as targeted.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Herein below, various embodiments of the present invention are described with reference to several drawings. In the various embodiments, an electric motor driving system is included in a motor generator driving system that drives a motor generator (hereafter simply referred to as a MG) composed of a three-phase alternating current (AC) motor to act as a power source of a hybrid car or an electric motor car. Hence, the electric motor driving system is defined as a system that controls driving of the MG. A motor and an electric motor driving system are herein below sometimes referred to as a MG and a MG control system, respectively.

Figure 1:
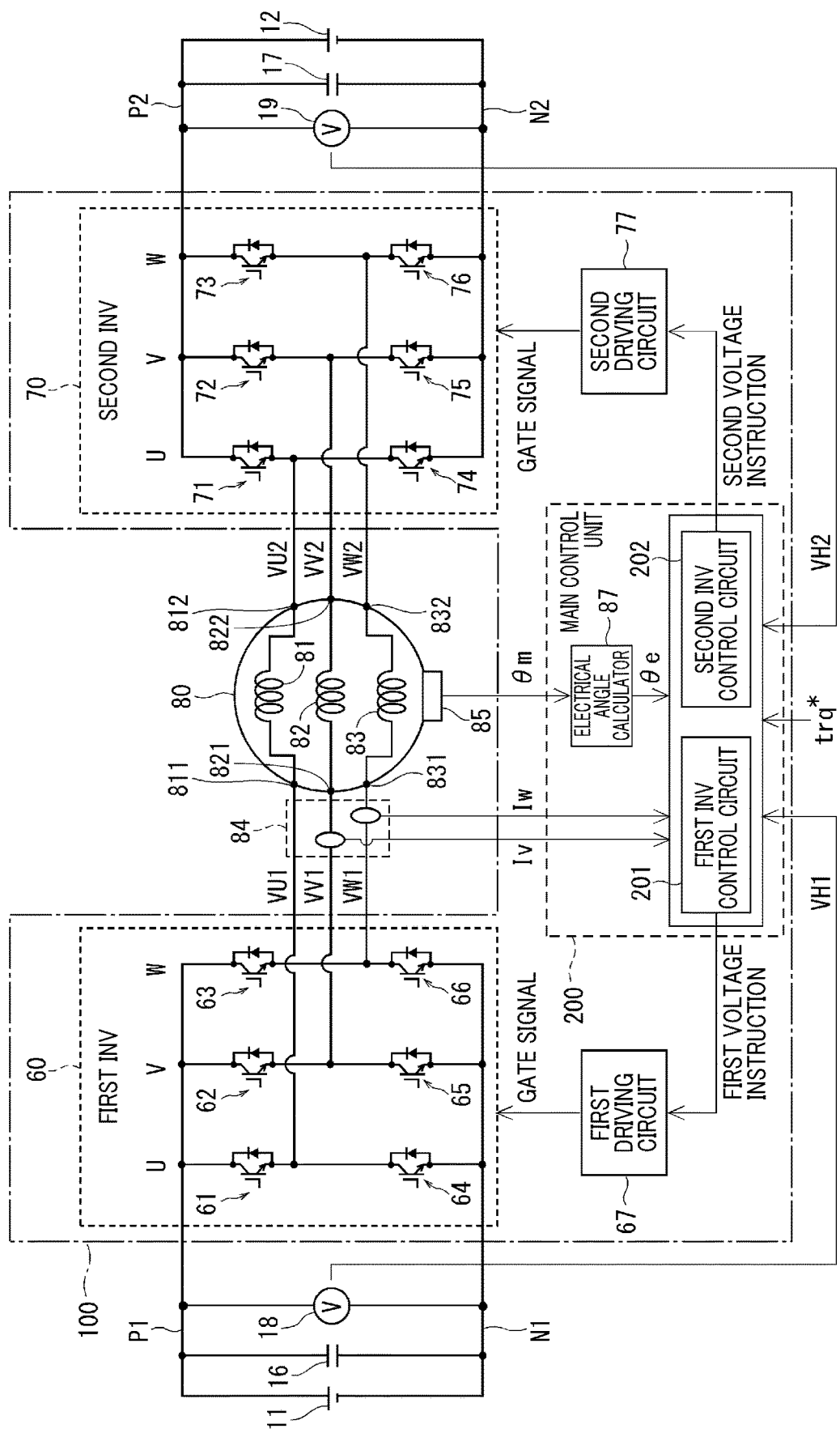
FIG. 1 is a chart illustrating an overall structure of an exemplary system, to which an electric motor driving system of one embodiment of the present invention is applied.

Referring now to the drawings, wherein like reference numerals designate identical or corresponding parts throughout the several views thereof, and in particular to FIG. 1, an overall structure of a system that employs a so-called dual electric power supply and dual inverter (i.e., a pair of electric power supplies 11 and 12, and a pair of first and second inverters 60 and 70) is illustrated. Specifically, a MG 80 is provided by including a three-phase AC motor with a U-phase winding 81, a V-phase winding 82, and a W-phase winding 83. The three-phase AC motor is a type of a permanent magnet synchronous motor (PMSM). Hence, when it is applied to a hybrid vehicle, the MG 80 functions as a motor to generate a torque to drive a driving wheel thereof. The MG 80 also functions as a generator to generate electricity when driven by kinetic energy from an engine and/or the driving wheel of the hybrid car.

The MG 80 of this embodiment employs an open winding system, so that end points of one of the three-phase windings 81, 82 and 83 (i.e., the U-phase winding 81, the V-phase winding 82, and the W-phase winding 83) are separated from end points of the other two of the three-phase windings 81, 82 and 83 as shown in the drawing. Subsequently, output pins of respective phases of the first inverter 60 are connected to corresponding one ends 811, 821 and 831 of the three-phase windings 81, 82 and 83, respectively. Similarly, output pins of respective phases of the second inverter 70 are connected to the other corresponding ends 812, 822 and 832 of the three-phase windings 81, 82 and 83, respectively. A rotating angle sensor 85 is provided by including a resolver or the like to detect a mechanical angle θm of the MG 80. The mechanical angle θm is converted into an electrical angle θe by an electrical angle calculator 87 included in a main control unit 200.

The first electric power supply 11 and the second electric power supply 12 serve as chargeable and dischargeable electrical storage devices, respectively, and are separated and insulated from each other. Each of the electrical storage devices employs a secondary battery, such as nickel-metal hydride, lithium-ion, etc., or an electric double-layer capacitor and the like. However, the first electric power supply 11 can employ an output type lithium-ion battery, and the second electric power supply 12 can employ a capacitance-type lithium-ion battery, for example. The respective first and second inverters 60 and 70 receive direct current (DC) powers from the respective electric power supplies 11 and 12, separately. Hence, the first electric power supply 11 can give and receive the electric power to and from the MG 80 via the first inverter 60. Similarly, the second electric power supply 12 can also give and receive the electric power to and from the MG 80 via the second inverter 70 as well.

Hence, the MG 80 receives electric power from the electric power supply 11 via the first inverter 60. The MG 80 also receives electric power from the second electric power supply 12 via the second inverter 70 as well. To respective sides of the three-phase windings 81, 82 and 83 facing the first inverter 60, a U-phase voltage VU1, a V-phase voltage VV1, and a W-phase voltage VW1 are applied. Similarly, to respective other sides of the three-phase windings 81, 82 and 83 facing the second inverter 70, a U-phase voltage VU2, a V-phase voltage VV2 and a W-phase voltage VW2 are also applied.

Further, multiple current sensors 84 may be provided in electric power paths extended from the first inverter 60 to the MG 80 to detect phase currents flown to the three-phase windings 81, 82 and 83. Although a V-phase current Iv and a W-phase current Iw are detected as one example in FIG. 1, any currents of either two-phase currents or three-phase currents may be detected by the multiple current sensors 84. The multiple current sensors 84 may also be disposed in electric power paths extended from the second inverter 70 to the MG 80 as well. Further, the current sensor 84 may be disposed in these pairs of electric power paths extended from both of the first and second inverters 60 and 70 to the MG 80, respectively.

A first capacitor 16 is provided and is connected between a high voltage side wiring P1 and a low voltage side wiring N1. Similarly, a second capacitor 17 is also provided and connected between a high voltage side wiring P2 and a low voltage side wiring N2. A first voltage sensor 18 is provided to detect an input voltage VH1 input from the first electric power supply 11 to the first inverter 60. A second voltage sensor 19 is also provided to detect an input voltage VH2 input from the second electric power supply 12 to the second inverter 70.

Here, the first inverter 60, the second inverter 70, the main control unit 200, and first and second driving circuits 67 and 77 collectively constitute a MG control system 100. Further, the first inverter 60 includes six first switching elements 61 to 66 connected in a bridge form corresponding to respective phases of the windings 81, 82 and 83. As shown in the drawing, the switching elements 61, 62 and 63 are located in upper arms of the U-phase, the V-phase, and the W-phase, respectively. The switching elements 64, 65 and 66 are located in lower arms of the U-phase, the V-phase, and the W-phase, respectively. Further, the second inverter 70 also includes six second switching elements 71 to 76 connected in a bridge form corresponding to the respective phases of the windings 81, 82 and 83. As shown in the drawing, the switching elements 71, 72 and 73 are located in the other upper arms of the U-phase, the V-phase, and the W-phase, respectively. The switching elements 74, 75 and 76 are located in the other lower arms of the U-phase, the V-phase, and the W-phase, respectively.

Each of the switching elements 61 to 66 and 71 to 76 is configured, for example, by an insulated gate bipolar transistor (IGBT). As also shown in the drawing, in the IGBT, a reflux diode is connected parallel to allow current to flow from a low voltage side to a high voltage side. To prevent short circuit possibly caused between the high voltage side wirings P1 and P2 and the low voltage side wirings N1 and N2, respectively, the upper and lower arm elements (i.e., the switching elements) 61 to 66 and 71 to 76 of the respective phases are not simultaneously turned on. That is, the upper and lower arm elements 61 to 66 and 71 to 76 of the respective phases are complementarily turned on and off such that when one of the upper arm elements 61 to 63 and 71 to 73 is turned on, the other one of the lower arm elements 64 to 66 and 74 to 76 is turned off.

Although each of devices is not illustrated, the main control unit 200 is configured by a microcomputer or the like at least including a central processing unit (CPU), a read only memory (ROM), an input/output (I/O) port, and a bus line to connect these devices with each other. Hence, the main control unit 200 conducts control by using both of software, in which a CPU runs prescribed program stored in a memory system (i.e., a readable and non-transitory tangible medium) such as a ROM, etc., and hardware such as a dedicated electronic circuit, etc., as well.

The main control unit 200 further includes a first inverter control circuit 201 that generates a first voltage instruction supplied to the first inverter 60 as an output voltage instruction based on a torque instruction trq* and a prescribed detection value as well. The main control unit 200 also includes a second inverter control circuit 202 that generates a second voltage instruction supplied to the second inverter 70 as an output voltage instruction based on the torque instruction trq* and a prescribed detection value as well. To the first and second inverter control circuits 201 and 202, an electrical angle θe is commonly input, and the pair of input voltages VH1 and VH2 or the like are respectively input, for example. As described later more in detail, according to one embodiment of the present invention, the phase currents Iv and Iw are fed back at least to the first inverter control circuit 201. Further, a first driving circuit 67 is provided to generate and output a gate signal to the first inverter 60 based on the first voltage instruction generated by the first inverter control circuit 201. A second driving circuit 77 is similarly provided to generate and output a gate signal to the second inverter 70 based on the second voltage instruction generated by the second inverter control circuit 202 as well.

Figure 2:
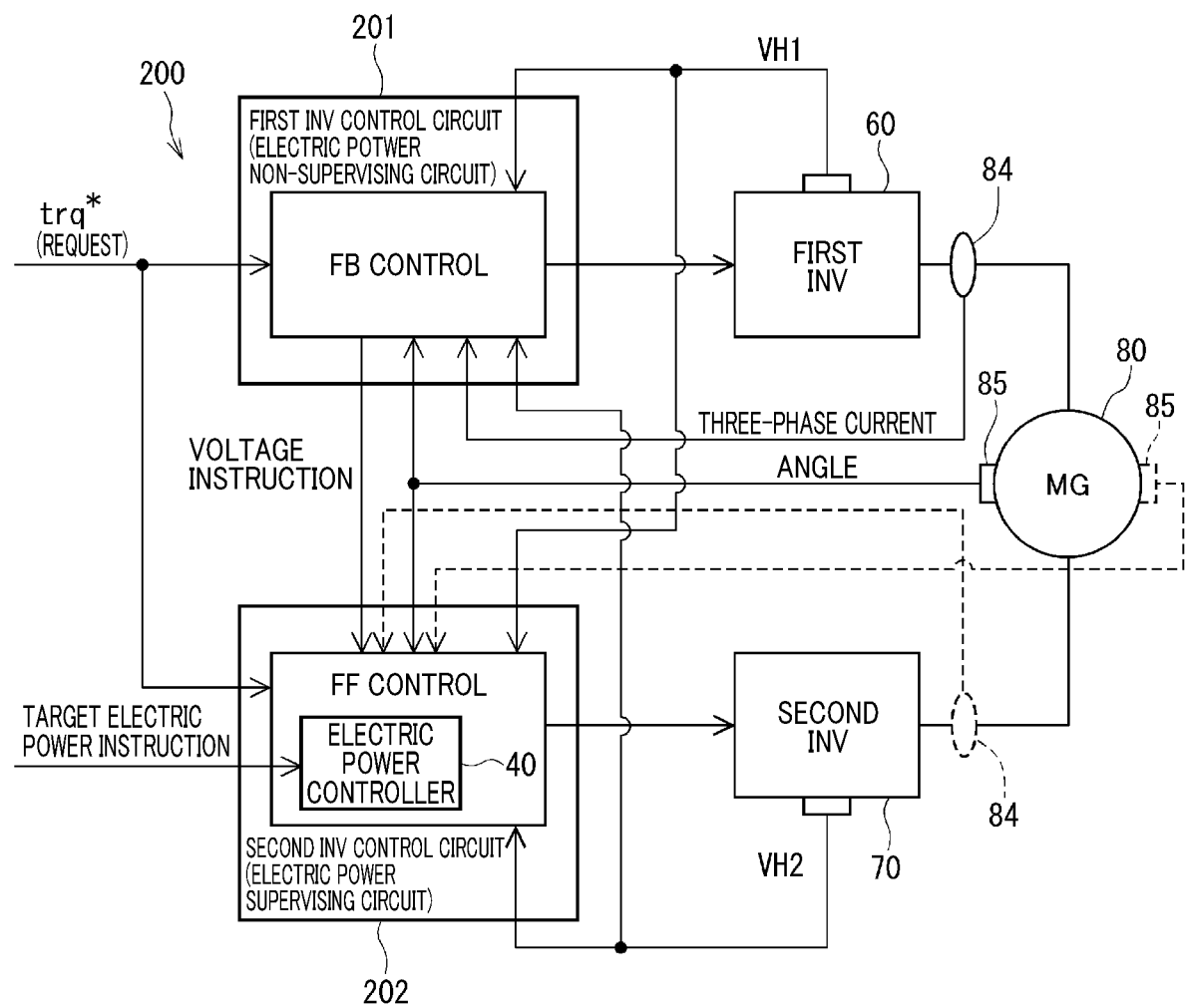
FIG. 2 is a chart schematically illustrating an exemplary controller according to one embodiment of the present invention.

Now, the main control unit 200 is further described more in detail with reference to FIG. 2, and following applicable drawings, wherein an indication INV represents an inverter. The first inverter control circuit 201 and the second inverter control circuit 202 may be arranged within either respective two microcomputers or a common single microcomputer. To operate as a system of the so-called dual electric power supply and dual inverter, each of the first and second inverter control circuits 201 and 202 generates an independent but cooperative voltage instruction.

Because the MG 80 is a common objective to control, it is enough for the main control unit 200 to commonly obtain multiple detection values of an angle (i.e., the electrical angle θe) and three-phase currents. However, since it conducts feed-forward control, the second inverter control circuit 202 does not need to obtain the detection values of the three-phase currents except when a voltage formula is calculated based on an actual current. Further, multiple current sensors 84 and rotating angle sensors may be employed so that the first and second inverter control circuits 201 and 202 can obtain corresponding detection values as shown by a broken line including when the second inverter control circuit 202 utilizes the detection values of the three-phase currents.

As described earlier, JP-3352182-B also discusses the inverter system that also drives a motor with a system of the so-called dual electric power supply and dual inverter. However, in such a so-called dual inverter and dual power supply system, when each of a pair of inverter control circuits controls a voltage instruction only in accordance with a torque as in the past, an amount of each of input and output electric powers to and from corresponding one of electric power supplies is sometimes determined regardless of a remaining amount therein. As a result, one electric power supply may enter a poor state of charge condition (a so-called SOC exhaustion) or the battery thereof is degraded (battery degradation) in some cases.

Subsequently, according to this embodiment of the present invention, an electric power controller 40 is only provided in one of the two inverter control circuits 201 and 202 included in the main control unit 200. Specifically, as shown in FIG. 2 as one example, since it includes the electric power controller 40, the second inverter control circuit 202 is designed as an electric power supervising circuit. By contrast, since it excludes the electric power controller 40, the first inverter control circuit 201 is designed as an electric power non-supervising circuit. Further, the second inverter control circuit 202 generates dq-axes voltage instructions by conducting feed-forward (FF) control to act as the electric power supervising circuit. By contrast, the first inverter control circuit 201 as the electric power non-supervising circuit generates dq-axes voltage instructions by conducting feedback (FB) control. However, the first inverter control circuit 201 and the second inverter control circuit 202 may switch their roles.

As shown in the drawing, the electric power controller 40 of the second inverter control circuit 202 obtains an instruction about target electric power targeted by the first and second inverters 60 and 70 from an external engine controller (ECU) disposed in a higher rank. The electric power controller 40 also obtains a first voltage instruction generated by the first inverter control circuit 201 by conducting the feedback control. The electric power controller 40 further obtains a second voltage instruction generated by the second inverter control circuit 202 by conducting the feed-forward control. Thus, based on these information, the electric power controller 40 generates an electric power post sharing voltage instruction to be output to the second inverter 70 (i.e., an inverter located on the electric power supervising circuit side).

That is, the electric power controller 40 located in a circuit on the feed-forward control side adjusts the voltage instruction (i.e., the voltage instruction generated by feed-forward control in the electric power supervising circuit) so that an amount of electric power shared with the second inverter 70 (i.e., the inverter located on the electric power supervising circuit side) becomes equivalent to a value of the electric power target amount instruction. When the amount of electric power of the second inverter 70 comes near the value of the electric power target amount instruction, the first inverter control circuit 201 acting as the electric power non-supervising circuit applies feedback control by using the feedback control function while outputting a voltage instruction to the first inverter 60 so that an actual torque generated based on a remaining voltage in the first inverter 60 can follow the torque instruction at the time. As a result, an amount of electric power of the first inverter 60 on the electric power non-supervising circuit side also becomes equivalent to the target value, so that electric power can be shared.

Figure 3:
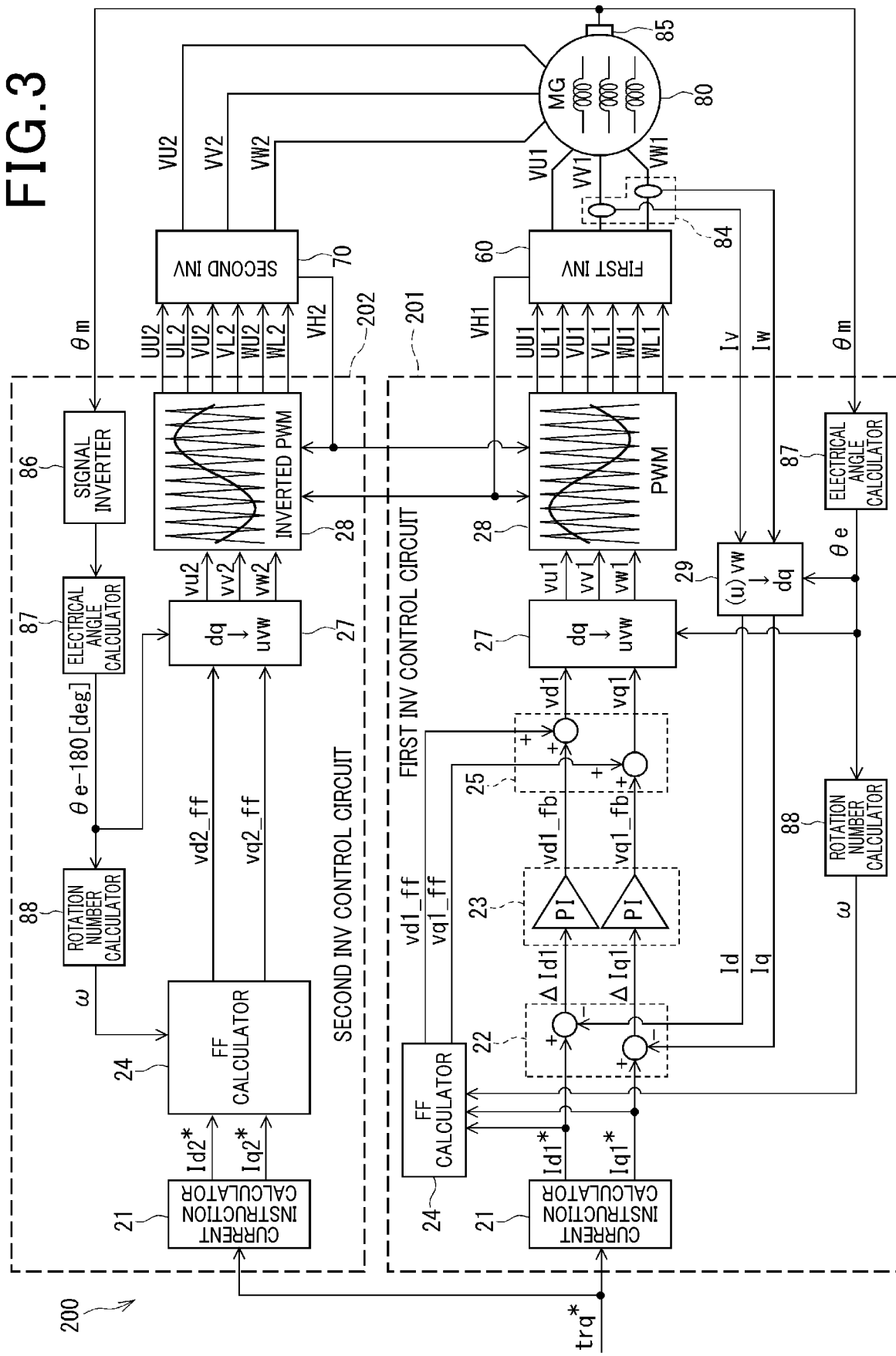
FIG. 3 is a block diagram illustrating the exemplary controller in detail except for an electric power controller according to one embodiment of the present invention.

Now, the embodiment of the present invention is described more in detail with reference to FIGS. 3 to 10. First, FIG. 3 illustrates an overall structure of a pair of inverter control circuits excluding an electric power controller 40. As shown there, a first inverter control circuit 201 is provided by including a current instruction calculator 21, a current subtracter 22, and a controller 23. The first inverter control circuit 201 also includes a feed-forward calculator 24, a voltage instruction adder 25, and a three-phase converter 27. The first inverter control circuit 201 further includes a modulator 28 and a second dq converter 29 or the like.

An electrical angle calculator 87 is also provided to convert a mechanical angle θm detected by a rotating angle sensor 85 into an electrical angle θe. A rotation number calculator 88 is also provided to convert the electrical angle θe into either an electrical angular velocity by differentiating the electrical angle θe by time or a rotation number ω by multiplying the electrical angular velocity by a prescribed coefficient. The electrical angle calculator 87 and the revolution number calculator 88 may be provided within a main control unit 200 disposed outside the first inverter control circuit 201. As shown in the drawing, various reference characters indicated in the first and second inverter control circuits 201 and 202 are suffixed by numerals 1 and 2, respectively, for the purpose of easy understanding of correspondence. By contrast, since it is commonly input to the first and second inverter control circuits 201 and 202, the mechanical angle θm is not suffixed by either the numeral 1 or the numeral 2.

The current instruction calculator 21 of the first inverter control circuit 201 calculates dq-axes current instructions Id1* and Iq1* based a torque instruction trq* by using a map and a formula or the like. The second dq converter 29 applies coordinate conversion to a pair of phase currents Iv and Iw obtained from the current sensor 84 and generates a pair of dq-axes currents Id and Iq by using the electrical angle θe, respectively. The second dq converter 29 subsequently feeds back these conversion results. The current subtracter 22 calculates dq-axes current deviations ΔId1 and ΔIq1 generated between a pair of dq-axes currents Id and Iq and a pair of dq-axes current instructions Id1* and Iq1*, respectively. The controller 23 conducts proportional-integral (PI) calculation and obtains feedback terms vd1_fb and vq1_fb of the dq-axes voltage instruction to approximate each of the dq-axes current deviations ΔId1 and ΔIq1 to 0.

By contrast, the feed-forward calculator 24 calculates feed-forward terms vd1_ff and vq1_ff of the dq-axes voltage instructions based on the pair of dq-axes current instructions Id1* and Iq1* and the rotation number ω of the MG by using a voltage formula as shown in the below described first formula. In the first formula, R represents a resistance of the winding, Ld and Lq represent dq-axes self-inductances, respectively, and φ represents a reverse electromotive voltage constant. Id and Iq may employ values obtained by the second dq converter 29 by converting actual currents instead of the current instructions Id1* and Iq1*, respectively.

Further, by taking the influence of ambient temperature into account, for example, a device constant such as values of resistance and inductance of a winding wire, etc., may be set variably.

$$vd = R \times Id - \omega \times Lq \times Iq,$$

$$vq = R \times Iq + \omega \times Ld \times Id + \omega \times \phi \quad \text{(First Formula)}$$

The voltage instruction adder 25 obtains a pair of dq-axes voltage instructions vd1 and vq1 by adding a pair of feedback terms vd1_fb and vq1_fb and a pair of feed-forward terms vd1_ff and vq1_ff, respectively. The voltage instruction adder 25 subsequently outputs the pair of dq-axes voltage instructions vd1 and vq1 to the three-phase converter 27. The three-phase converter 27 converts the dq-axes voltage instructions vd1 and vq1 into three-phase voltage instructions vu1, vv1 and vw1 by using the electrical angle θe. Further, the modulator 28 obtains a pair of input voltages VH1 and VH2 from the respective first and second inverters 60 and 70, and generates gate signals UU1, UL1, VU1, VL1, WU1 and WL1 by applying pulse width modulation (PWM) control. These gate signals UU1, UL1, VU1, VL1, WU1 and WL1 are subsequently supplied to the respective switching elements 61 to 66 of the first inverter 60.

On the other hand, in the second inverter control circuit 202, a feedback control system may be excluded by contrast. Accordingly, only a pair of feed-forward terms vd2_ff and vq2_ff is generated by a feed-forward calculator 24 of the second inverter control circuit 202 and is input to a three-phase converter 27 thereof. That is, the pair of feed-forward terms vd2_ff and vq2_ff corresponds to the second voltage instruction issued by applying the feed forward control.

Further, in the second inverter control circuit 202, a mechanical angle θm input from the rotating angle sensor 85 is inverted by a signal inverter 86 and is subsequently converted into an electrical angle (θe−180 [deg]) by an electrical angle calculator 87 provided therein. Further, a modulator 28 of the second inverter control circuit 202 obtains the pair of input voltages VH1 and VH2 and generates multiple gate signals UU2, UL2, VU2, VL2, WU2 and WL2 by oppositely conducting a PWM control to that conducted by the first inverter control circuit 201. The multiple gate signals UU2, UL2, VU2, VL2, WU2 and WL2 are subsequently supplied to respective switching elements 71 to 76 of the second inverter 70. Again, the exemplary configuration of the main control unit 200 described heretofore is just one example.

Figure 4:
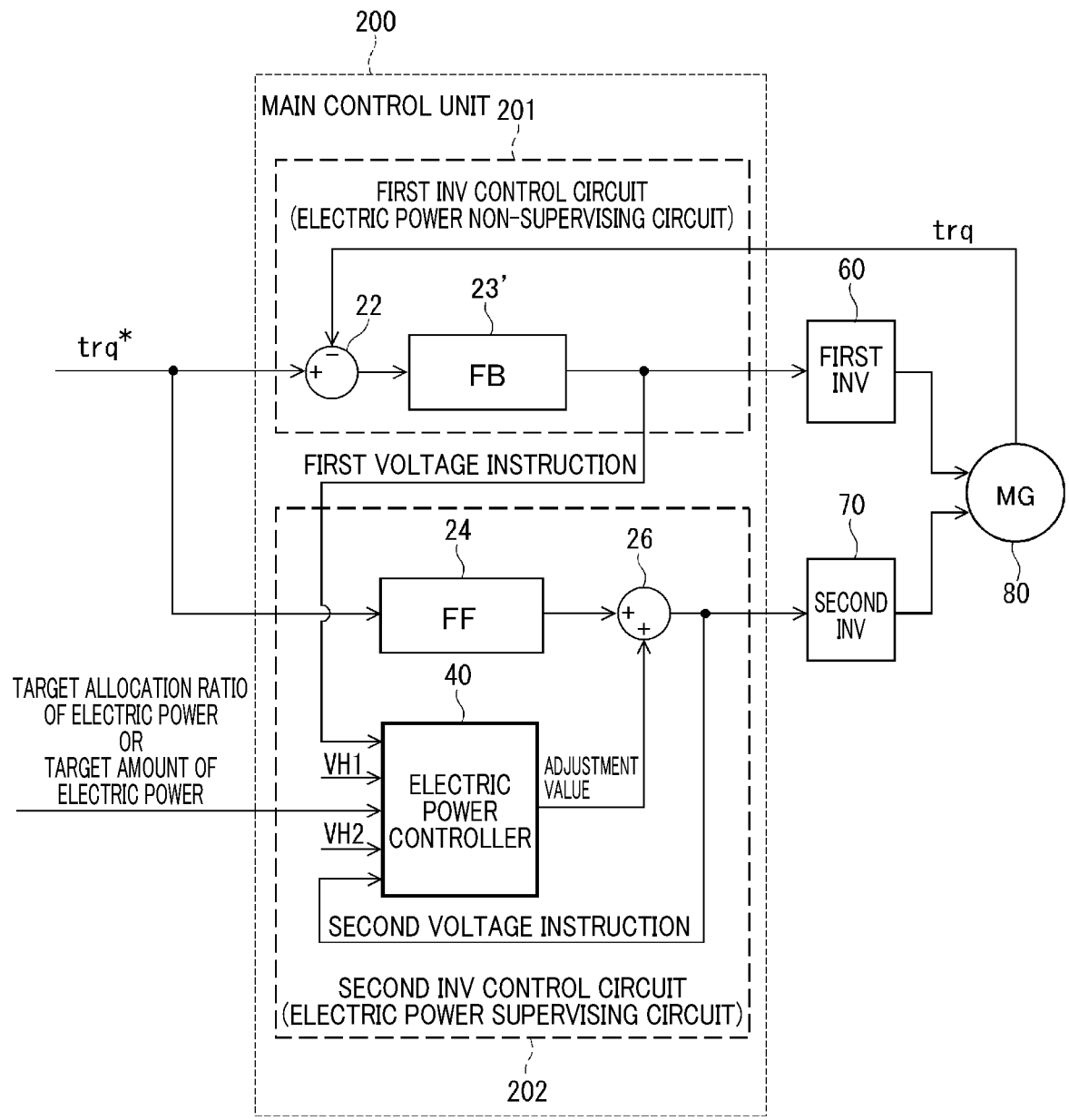
FIG. 4 is a block diagram schematically illustrating input and output of signals to and from the electric power controller according to one embodiment of the present invention.
Figure 5:
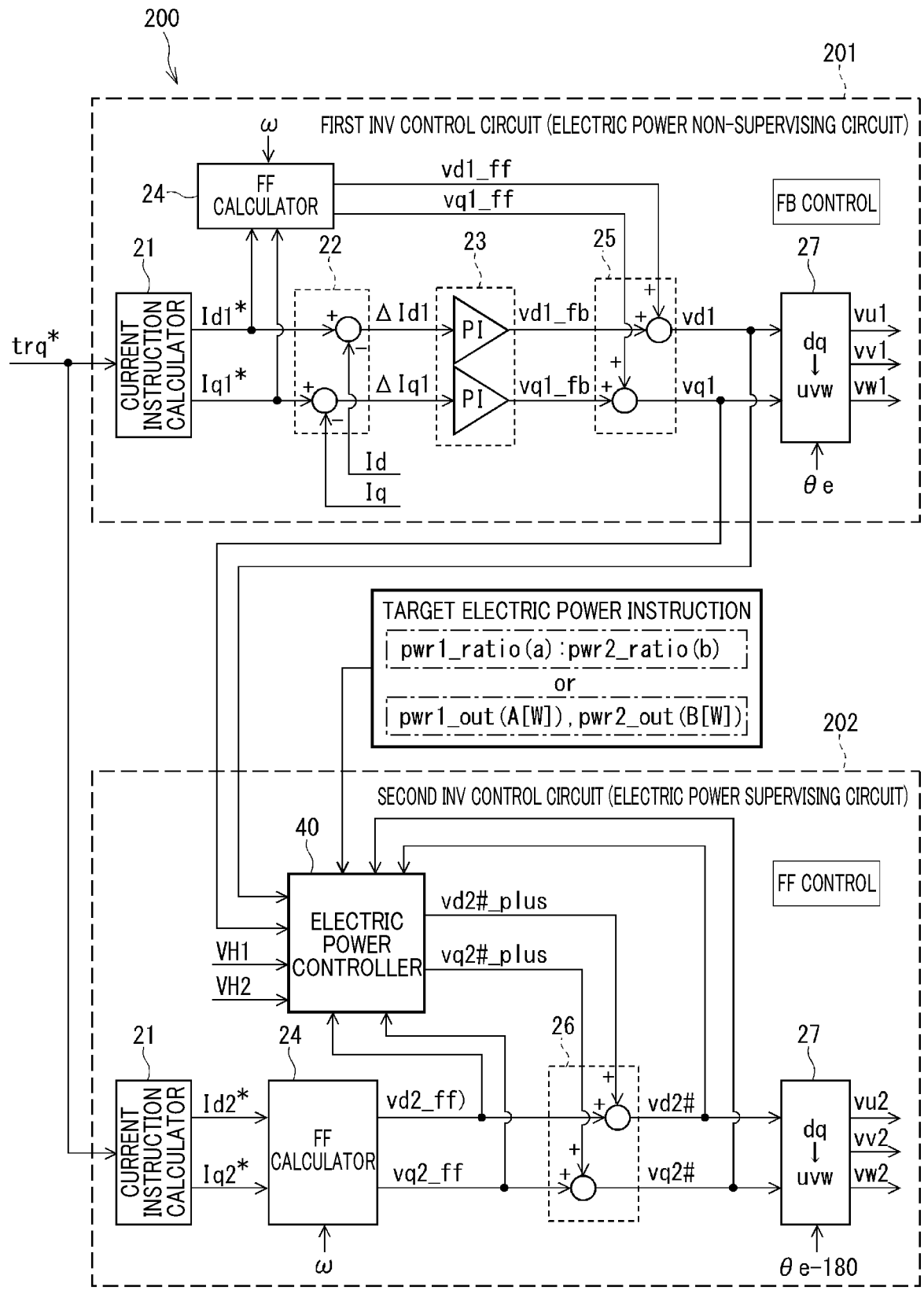
FIG. 5 is a block diagram also illustrating input and output of the signals to and from the electric power controller more in detail according to one embodiment of the present invention.

Now, various signals input and output to and from the electric power controller 40 are described with reference to respective block diagrams of FIGS. 4 and 5. That is, FIG. 4 is a chart schematically illustrating a basic configuration of the main control unit 200. Whereas FIG. 5 is a chart illustrating another basic configuration of the main control unit 200 additionally including the electric power controller 40 illustrated in FIG. 3. As illustrated in FIG. 4, a feedback controller of the first inverter control circuit 201 is indicated by one block with a reference numeral 23' for the sake of simplification thereof. The reference numeral 23' means that it accommodates the controller 23 of FIG. 3. A deviation calculator 22' is provided in the first inverter control circuit 201 and is equivalent to the current subtracter 22 of FIG. 3. However, the deviation calculator 22' is not limited to a device that only calculates respective deviations of the dq-axes currents Id and Iq, but is to be widely interpreted that the deviation calculator 22' is a device also calculates a deviation between the torque instruction trq* and an actual torque trq as well.

By contrast, as shown, in the second inverter control circuit 202 acting as the electric power supervising circuit, the electric power controller 40 is disposed. To the electric power controller 40, a first voltage instruction generated in the first inverter control circuit 201, a second voltage instruction generated in the second inverter control circuit 202, and a pair of input electric powers VH1 and VH2 from the respective first and second inverters 60 and 70 are input. Also, either an electric power target sharing ratio or a target amount of electric power is input to the electric power controller 40 to serve as a target electric power instruction. The electric power controller 40 subsequently generates an adjustment value for sharing based on these items of information. The adjustment value for sharing is subsequently added to the second voltage instruction output from the feed-forward calculator 24 by the adjustment value adder 26.

In FIG. 5, an electric power target sharing ratio assigned to the first inverter 60 is represented by either pwr1_ratio or a letter a. Whereas an electric power target sharing ratio assigned to the second inverter 70 is represented by either pwr2_ratio or a letter b. Thus, the sum of the electric power target sharing ratios is one (i.e., a+b=1). Further, an electric power target amount targeted by the first inverter 60 is represented by either pwr1_out or A[W]. Whereas an electric power target amount targeted by the second inverter 70 is represented by either pwr2_out or B[W] as well.

As illustrated in FIG. 5, the electric power controller 40 outputs a pair of second voltage instruction adjustment values vd2 #_plus and vq2 #_plus. The adjustment value adder 26 subsequently adds the second voltage instruction adjustment values vd2 #_plus and vq2 #_plus to original second voltage instructions vd2_ff and vq2_ff, thereby obtaining a pair of electric power post sharing second voltage instructions vd2 # and vq2 #, respectively. Here, the symbol # represents an electric power post sharing amount related to the voltage instruction. The pair of electric power post sharing second voltage instructions vd2 # and vq2 # is subsequently output to the dq converter 27 as shown.

As described heretofore, it is a point of this embodiment of the present invention that the second inverter control circuit 202 conducting the feed-forward control conducts the electric power sharing control. Hence, a voltage instruction generated by adding the sharing use adjustment value to the second voltage instruction generated by conducting the feed-forward control is supplied to the second inverter 70 located in a circuit on the feed-forward control side. As a consequence, electric power of the second inverter 70 changes and the first inverter control circuit 201 that conducts the feedback control is affected by such a change. The first inverter control circuit 201 subsequently reacts and controls an actual torque trq to follow the torque instruction trq*. Hence, electric power sharing between the first and second inverters 60 and 70 is achieved as targeted.

Figure 6:
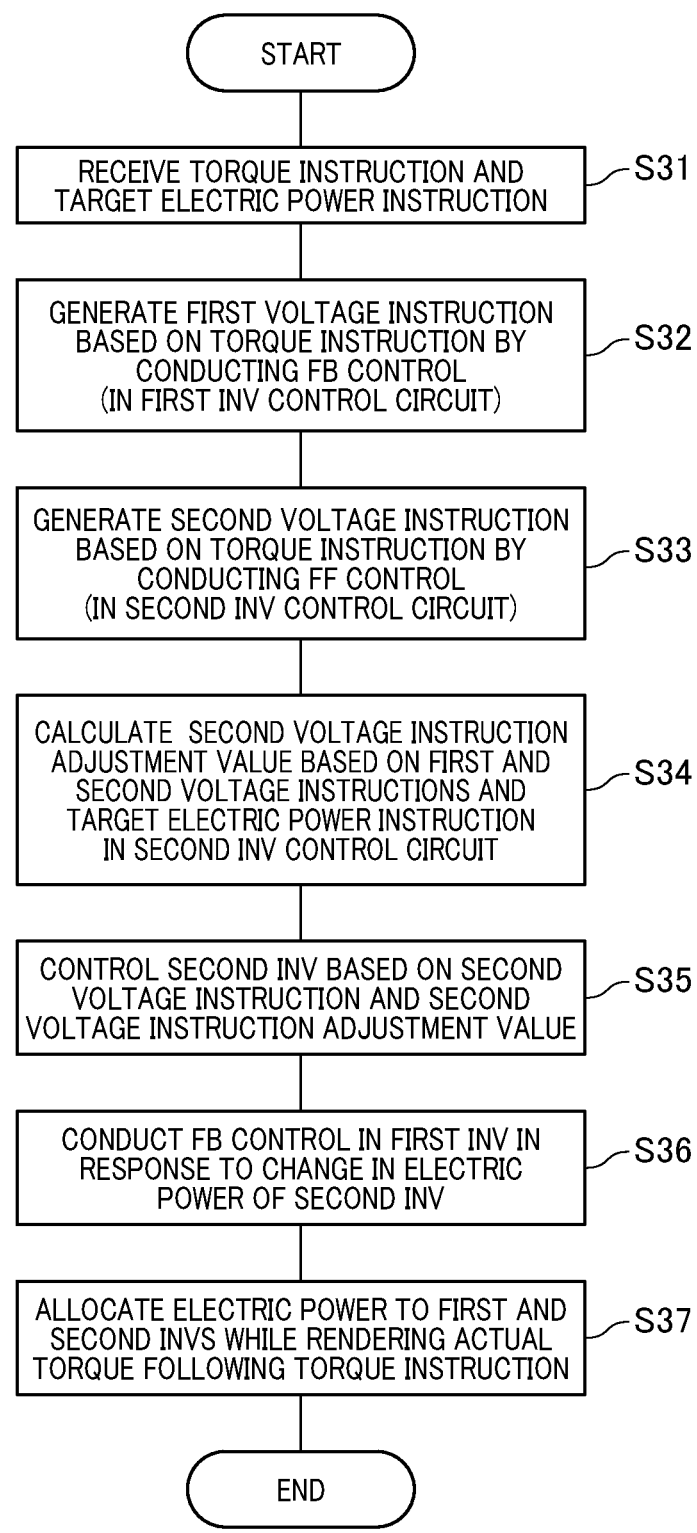
FIG. 6 is a flowchart illustrating an exemplary electric power sharing process conducted by the electric power controller according to one embodiment of the present invention.

Now, an exemplary sequence of the electric power sharing process conducted by the electric power controller 40 according to one embodiment of the present invention is described with reference to a flowchart of FIG. 6, wherein a letter S represents a step of the process. First, in step S31, the electric power controller 40 receives the torque instruction trq* and the electric power target instruction as well. Subsequently, in step S32, the first inverter control circuit 201 generates the pair of first voltage instructions vd1 and vq1 based on the torque instruction trq* by conducting the feedback control. In step S33, the second inverter control circuit 202 generates the pair of second voltage instructions vd2_ff and vq2_ff based on the torque instruction trq* by conducting the feed-forward control.

Further, in step S34, the electric power controller 40 calculates the pair of second voltage instruction adjustment values vd2 #_plus and vq2 #_plus in a circuit on the feed-forward control side (i.e., the second inverter control circuit 202) based on the pair of first voltage instructions vd1 and vq1, the pair of second voltage instructions vd2_ff and vq2_ff, and the electric power target instruction. In step S35, the second inverter control circuit 202 adds the pair of second voltage instruction adjustment values vd2 #_plus and vq2 #_plus to the pair of pre-adjustment second voltage instructions vd2_ff and vq2_ff, thereby obtaining the pair of electric power post sharing second voltage instructions vd2 # and vq2 #, respectively. The second inverter control circuit 202 also controls the second inverter 70 based on the pair of electric power post sharing second voltage instructions vd2 # and vq2 #.

In step S36, the first inverter control circuit 201 conducts the feedback control in response to the change of the electric power in the second inverter 70. In step S37, the actual torque is controlled to follow the torque instruction trq* while sharing the electric power between the first inverter 60 and the second inverter 70.

Now, a basic theory of the electric power sharing operation conducted by the electric power controller 40 is described with reference to FIG. 7. In this embodiment of the present invention, respective sharing amounts of electric power between the first and second inverters 60 and 70 are adjusted by changing amplitudes of the dq-axes voltage instruction vectors used for the respective first and second inverters 60 and 70 in accordance with an output of the MG on condition that respective phases of the dq-axes voltage instruction vectors are aligned with each other. Here, the phase of the voltage instruction vector represents a property of changing a polarity of charge and discharge. The amplitude of the voltage instruction vector represents an absolute amount of electric power.

That is, as discussed in JP-3352182-B, in the so-called dual inverter and dual electric supply system, the pair of first and second inverters 60 and 70 cooperates with each other and generates the maximum output when the polarity is opposite to each other, specifically, a difference in the phase therebetween is 180 degree. Accordingly, the first voltage instruction vector V1 is illustrated as is, while the second voltage instruction vector V2 is illustrated as rotated by the angle of 180 degree around a coordinate origin so that the voltage phases of the respective vectors can align with each other. Herein below, when it is mentioned that both phases are aligned with each other, it means that the voltage instruction vectors enter the above-described positional relation.

Figure 7:
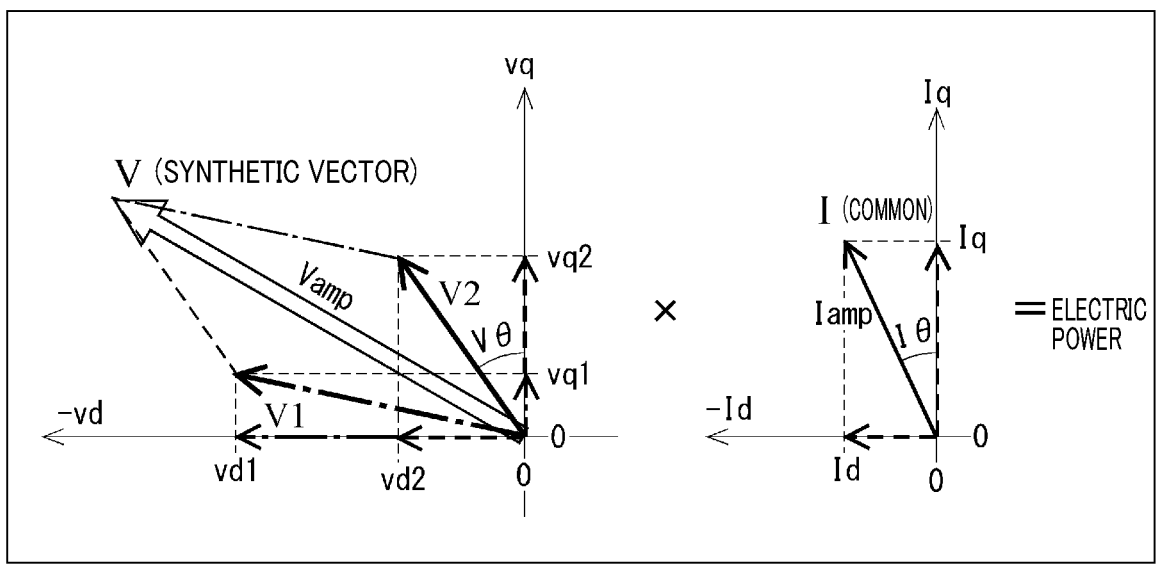
FIG. 7 is a chart illustrating a basic theory of electric power sharing operation conducted by the electric power controller according to one embodiment of the present invention.
Figure 7:
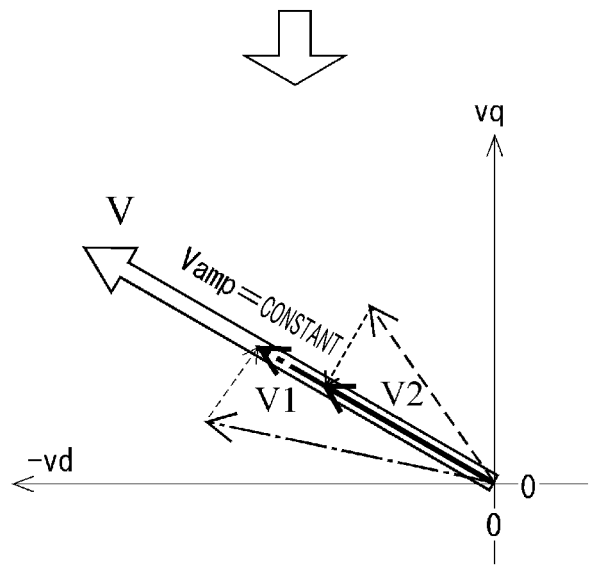

An upper chart of FIG. 7 represents that a product of a voltage vector and a current vector is equivalent to electric power. Specifically, a left part of the upper chart illustrates a voltage vector, in which a first voltage instruction vector V1 is composed of a d-axis component vd1 and a q-axis component vq1, and a second voltage instruction vector V2 is composed of a d-axis component vd2 and a q-axis component vq2 as well. Each of the components vd1, vd2, vq1 and vq2 is a value after voltage correction. Further, amplitude of a synthetic vector V is represented by Vamp, and a phase thereof is represented by Vθ as well. The voltage phase Vθ is defined with reference to the q-axis extending in a positive direction and increases counterclockwise.

Further, a right part of the upper chart of FIG. 7 illustrates a current vector I. As shown, a current amplitude Imp and a current phase Iθ are common to the pair of first and second inverters 60 and 70. Similar to the voltage phase Vθ, the current phase Iθ is also defined with reference to the q-axis extending in the positive direction and increases counterclockwise again. Accordingly, a total electric power Pwr_all of the pair of first and second inverters 60 and 70 is represented by using a voltage effective value Vmean, a current effective value Irms, and a power factor angle φ as shown in the first line of the below described second formula. Further, as shown in the second line of the second formula, the total electric power Pwr_all is also represented as the sum of electric power of the first inverter 60 (i.e., Id×vd1+Iq×vq1) and electric power of the second inverter 70 (i.e., Id×vd2+Iq×vq2). Hence, when the sum of the d-axis voltages (vd1+vd2) and the sum of the q-axis voltages (vq1+vq2) remains unchanged, the total electric power Pwr_all also remains unchanged accordingly.

$$\text{Pwr\_all} = \sqrt{3} \times Vmean \times Irms \times \cos\varphi \quad \text{(Second Formula)}$$
$$= (Id \times vd1 + Iq \times vq1) +$$
$$(Id \times vd2 + Iq \times vq2)$$
$$= Id \times (vd1 + vd2) + Iq \times (vq1 + vq2)$$

A bottom chart of FIG. 7 illustrates introduction of a power sharing ratio (a:b) to the second formula. That is, when the sharing ratio (a:b) between the first and second inverters 60 and 70 is used, the above-described second formula is converted into the below described third formula. That is, the first term of the third formula represents the electric power post sharing amount vd1 #. The second term represents the electric power post sharing amount vq1 #. The third term also represents the electric power post sharing amount vd2 #. The fourth term represents the electric power post sharing amount vq2 # as well.

$$\text{Pwr\_all} = \quad \text{(Third Formula)}$$
$$Id \times \frac{a}{a+b} \times (vd1 + vd2) + Iq \times \frac{a}{a+b} \times (vq1 + vq2) +$$
$$Id \times \frac{b}{a+b} \times (vd1 + vd2) + Iq \times \frac{b}{a+b} \times (vq1 + vq2)$$

Figure 8:
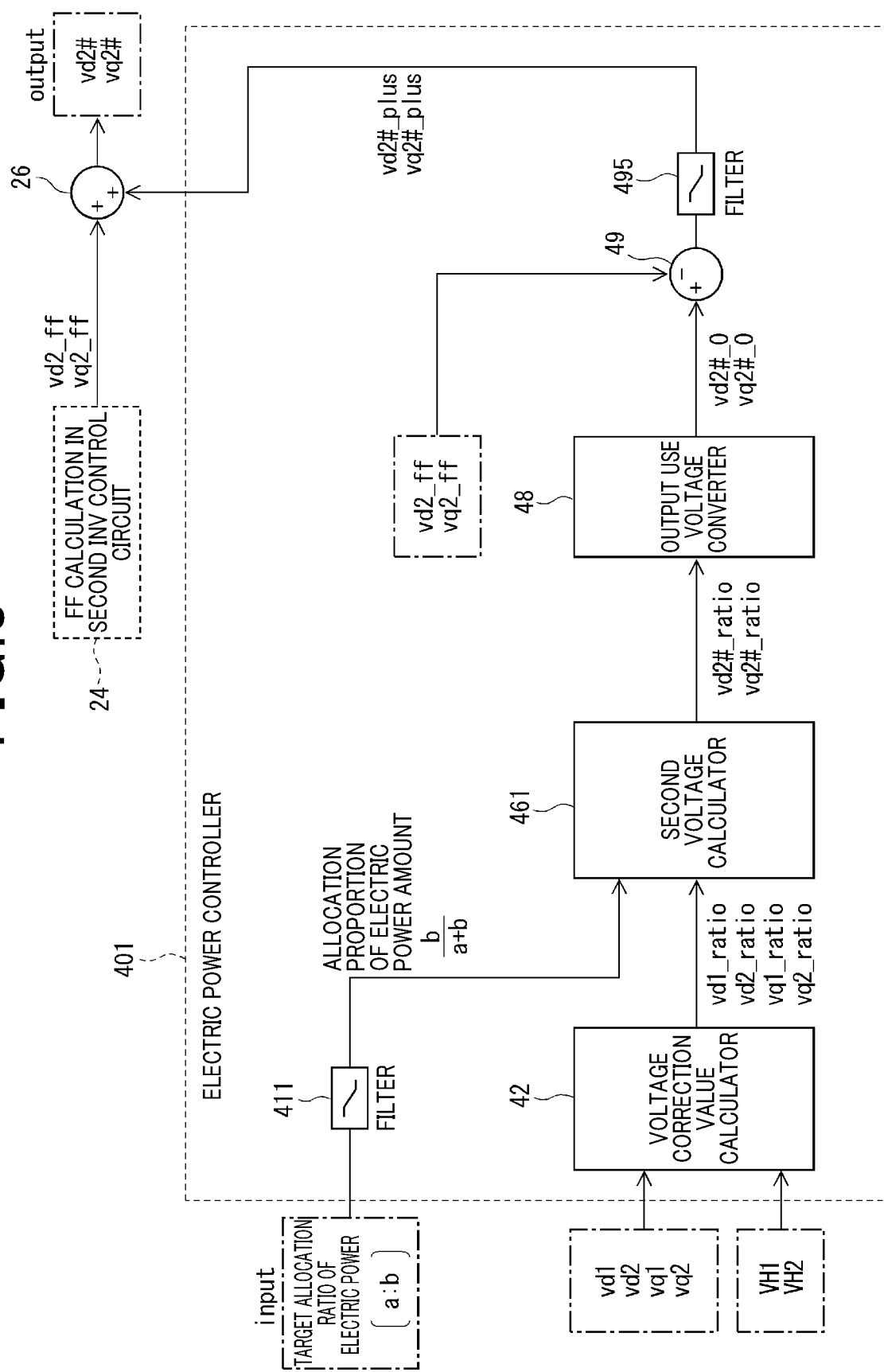
FIG. 8 is a block diagram illustrating an exemplary electric power controller according to a first example of one embodiment of the present invention.

Now, various modifications of the present invention employing different examples of an electric power controller 40 are herein below described with reference to FIGS. 8 to 10. In the drawings, respective order numbers of the different examples are included in reference numerals attached to electric power controllers of the different examples as third digits right after the numerals 40.

As a first modification of the present invention, a configuration of a first exemplary electric power controller 401 is described with reference to FIG. 8. As shown, an electric power target sharing ratio (i.e. a gain) is input to the electric power controller 401 as the electric power target amount instruction. The electric power controller 401 subsequently adjusts a voltage instruction supplied to the second inverter 70 by using an adjustment value obtained by allocating dq-axes voltage instructions for each of the pair of first and second inverters 60 and 70 based on the electric power target sharing ratio. Hence, in the first example, since multiplication and division is applied to the voltage instruction supplied to the second inverter 70 in accordance with the electric power target sharing ratio, a sharing response can be upgraded.

More specifically, in the first example, the electric power sharing ratio (a:b (a+b=1)) between electric power amounts allocated to the respective first and second inverters 60 and 70 is initially input to the electric power controller 401 as the electric power target instruction. A filter 411 provided in the electric power controller 401 subsequently applies a slow change process to the electric power sharing ratio to either suppress or reduce a sudden change thereof. After completing the filtering process, an electric power proportion of an electric power amount allocated to the second inverter 70 to the sum of electric power amounts (i.e., b/(a+b)) is input to a second voltage calculator 461 also provided in the electric power controller 401.

A voltage correction value calculator 42 is also provided in the 401 and receives the pair of first voltage instructions vd1 and vq1, the pair of second voltage instructions vd2 and vq2, the first input voltage VH1, and the second input voltage VH2. The voltage correction value calculator 42 calculates multiple voltage correction values vd1_ratio, vd2_ratio, vq1_ratio and vq2_ratio by multiplying a proportion of each of the input voltages VH1 and VH2 to these total input voltage to the pairs of the first and second voltage instructions vd1, vd2, vq1 and vq2 by using the below described fourth formula, respectively. Here, each of the voltage correction values represents an actual variation degree.

$$vd1\_ratio = vd1 \times \frac{VH1}{VH1 + VH2}$$
$$vd2\_ratio = vd2 \times \frac{VH2}{VH1 + VH2}$$
$$vq1\_ratio = vq1 \times \frac{VH1}{VH1 + VH2}$$
$$vq2\_ratio = vq2 \times \frac{VH2}{VH1 + VH2}$$

(Fourth Formula)

A second voltage calculator 461 also provided in the 401 subsequently calculates a pair of electric power post sharing second voltages vd2 #_ratio and vq2 #_ratio for the respective d-axis and q-axis by multiplying the sum of voltage correction values of the first and second inverters 60 and 70 by the electric power sharing ratio of the second inverter 70 (b/(a+b)) by using the below described fifth formula.

$$vd2\#\_ratio = \frac{b}{a+b} \times (vd1\_ratio + vd2\_ratio)$$
$$vq2\#\_ratio = \frac{b}{a+b} \times (vq1\_ratio + vq2\_ratio)$$

(Fifth Formula)

An output use voltage converter 48 also provided in the 401 subsequently converts the pair of electric power post sharing second voltages vd2 #_ratio and vq2 #_ratio into a pair of output use second voltages vd2 #_0 and vq2 #_0 before filtering by multiplying the pair of electric power post sharing second voltages vd2 #_ratio and vq2 #_ratio by an inverse number of an input voltage ratio by using the below described sixth formula.

$$vd2\#\_0 = vd2\#\_ratio \times \frac{VH1 + VH2}{VH2}$$
$$vq2\#\_0 = vq2\#\_ratio \times \frac{VH1 + VH2}{VH2}$$

(Sixth formula)

A FF term subtracter 49 also provided in the 401 subtracts feed-forward terms vd2_ff and vq2_ff of the second voltage instructions from the output use second voltages vd2 #_0 and vq2 #_0 before filtering, respectively. Subsequently, only a pair of adjustment values obtained by subtracting the feed-forward terms vd2_ff and vq2_ff are subjected to a response delaying process in the filter 495. After that, the pair of adjustment values is input to an adjustment value adder 26 also provided in the 401 as a pair of second voltage instruction adjustment values vd2 #_plus and vq2 #_plus, respectively. The adjustment value adder 26 subsequently adds the second voltage instruction adjustment values vd2 #_plus and vq2 #_plus to the second voltage instruction feed-forward terms vd2_ff and vq2_ff, thereby outputting a pair of electric power post sharing second voltage instructions vd2 # and vq2 #, respectively.

Figure 9:
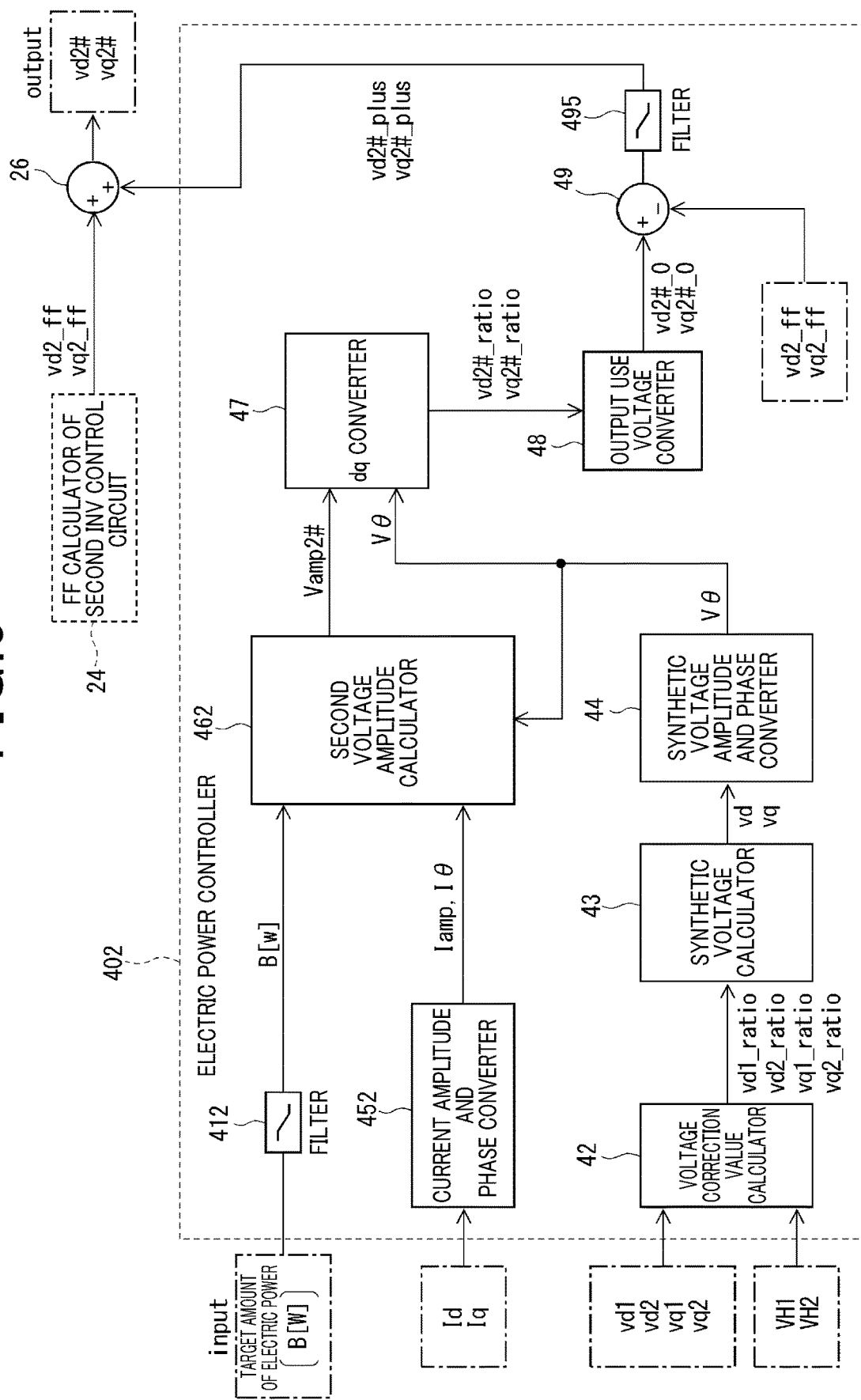
FIG. 9 is a block diagram illustrating an exemplary electric power controller according to a second example of one embodiment of the present invention.

Now, a configuration of a second exemplary electric power controller 402 is described as another modification of the present invention with reference to FIG. 9. In this example, as described later more in detail, an electric power target amount targeted by the second inverter 70 located on the electric power supervising circuit side) is input to the electric power controller 402 as the electric power target instruction. Hence, in contrast to the first example in which multiplication and subtraction of the sharing ratio is conducted, since it simply conducts addition and subtraction of an electric power amount itself, the second example can conduct more stable sharing operation while either preventing or suppressing growth of the error.

That is, in the second example, the amount of electric power is used as the electric power target instruction instead of the sharing ratio as used in the first example. Hence, the electric power controller 402 calculates an amount of electric power of the second inverter 70 on the electric power supervising circuit side based on dq-axes currents and dq-axes voltages by using an electric power formula so that the amount of electric power of the second inverter 70 follows the amount of electric power input as the electric power target instruction. The electric power controller 402 further calculates voltage amplitude that fills in deviation from an amount of electric power before sharing, thereby determining dq-axes voltage instructions capable of generating the amount of electric power input as the electric power target instruction.

More specifically, as the electric power target instruction, a target amount of electric power B[W] targeted by the second inverter 70 is input to the electric power controller 402. The target amount of electric power B[W] is subsequently processed by a filter 412 provided in the electric power controller 402 not to suddenly change thereby reducing an impact thereof. After completing the filtering process, the electric power target amount B[W] is input to a second voltage amplitude calculator 462 also provided in the electric power controller 402 for electric power use. Further, a current amplitude and phase converter 452 is also provided in the electric power controller 402 and receives a pair of dq-axes currents Id and Iq commonly used in controlling each of the pair of first and second inverters 60 and 70. The current amplitude and phase converter 452 subsequently converts the pair of dq-axes currents Id and Iq into a current amplitude Iamp and a current phase Iθ defined with reference to the q-axis by using the below described seventh formula. The current amplitude and phase converter 452 subsequently outputs the current amplitude Iamp and the current phase Iθ to the second voltage amplitude calculator 462.

$$Iamp = \sqrt{Id^2 + Iq^2} \quad \text{(Seventh Formula)}$$

$$I\theta = \tan^{-1}\left(\frac{-Id}{Iq}\right)$$

Similar to the first example, a voltage correction value calculator 42 is provided in the electric power controller 402 to calculate and output multiple voltage correction values vd1_ratio, vd2_ratio, vq1_ratio and vq2_ratio based on the respective voltage instructions vd1, vd2, vq1 and vq2 as well as the input voltages VH1 and VH2. A synthetic voltage calculator 43 also provided in the electric power controller 402 subsequently calculates dq-axes synthetic voltages vd and vq based on the outputs of the voltage correction value calculator 42 by using the below described eighth formula. A synthetic voltage amplitude and phase converter 44 also provided in the electric power controller 402 subsequently converts the dq-axes synthetic voltages vd and vq into a synthetic voltage phase V$\theta$ defined with reference to the q-axis by using the below described ninth formula. The synthetic voltage amplitude and phase converter 44 subsequently outputs the synthetic voltage phase V$\theta$ to the second voltage amplitude calculator 462 and a dq converter 47 also provided in the electric power controller 402 at the same time.

$$vd = vd1\_ratio + vd2\_ratio \quad \text{(Eighth Formula)}$$
$$vq = vq1\_ratio + vq2\_ratio$$

$$v\theta = \tan^{-1}\left(\frac{-vd}{vq}\right) \quad \text{(Ninth Formula)}$$

The second voltage amplitude calculator 462 calculates an electric power post sharing second voltage amplitude Vamp2 # based on the target amount of electric power B[W], the current amplitude Iamp, and a power factor angle of a synthetic voltage (V$\theta$−I$\theta$) by using the below described tenth formula.

$$Vamp2\# = \frac{B}{Iamp \times \cos(V\theta - I\theta)} \quad \text{(Tenth Formula)}$$

The dq converter 47 subsequently calculates dq-axes second voltages vd2 #_ratio and vq2 #_ratio as electric power post sharing values based on the electric power post sharing second voltage amplitude Vamp2 # and the synthetic voltage phase V$\theta$ by using the below described eleventh formula.

$$vd2\#\_ratio = Vamp2\# \times \sin V\theta$$

$$vq2\#\_ratio = Vamp2\# \times \cos V\theta \quad \text{(Eleventh Formula)}$$

Similar to the first example, an output use voltage value converter 48 provided in the electric power controller 402 multiplies each of the electric power post sharing second voltages vd2 #_ratio and vq2 #_ratio by an inverse number of the input voltage ratio to convert the electric power post sharing second voltages vd2 #_ratio and vq2 #_ratio into output use second voltages vd2 #_0 and vq2 #_0 before filtering, respectively. Subsequently, as in the first example, a pair of second voltage instruction adjustment values vd2 #_plus and vq2 #_plus is input to an adjustment value adder 26 via a FF term subtracter 49 and a filter 495 also provided in the electric power controller 402. Subsequently, the pair of second voltage instruction adjustment values vd2 #_plus and vq2 #_plus is added to the pair of feed-forward terms vd2_ff and vq2_ff of the second voltage instruction, respectively, so that a pair of electric power post sharing second voltage instructions vd2 # and vq2 # is output from the adjustment value adder 26.

Figure 10:
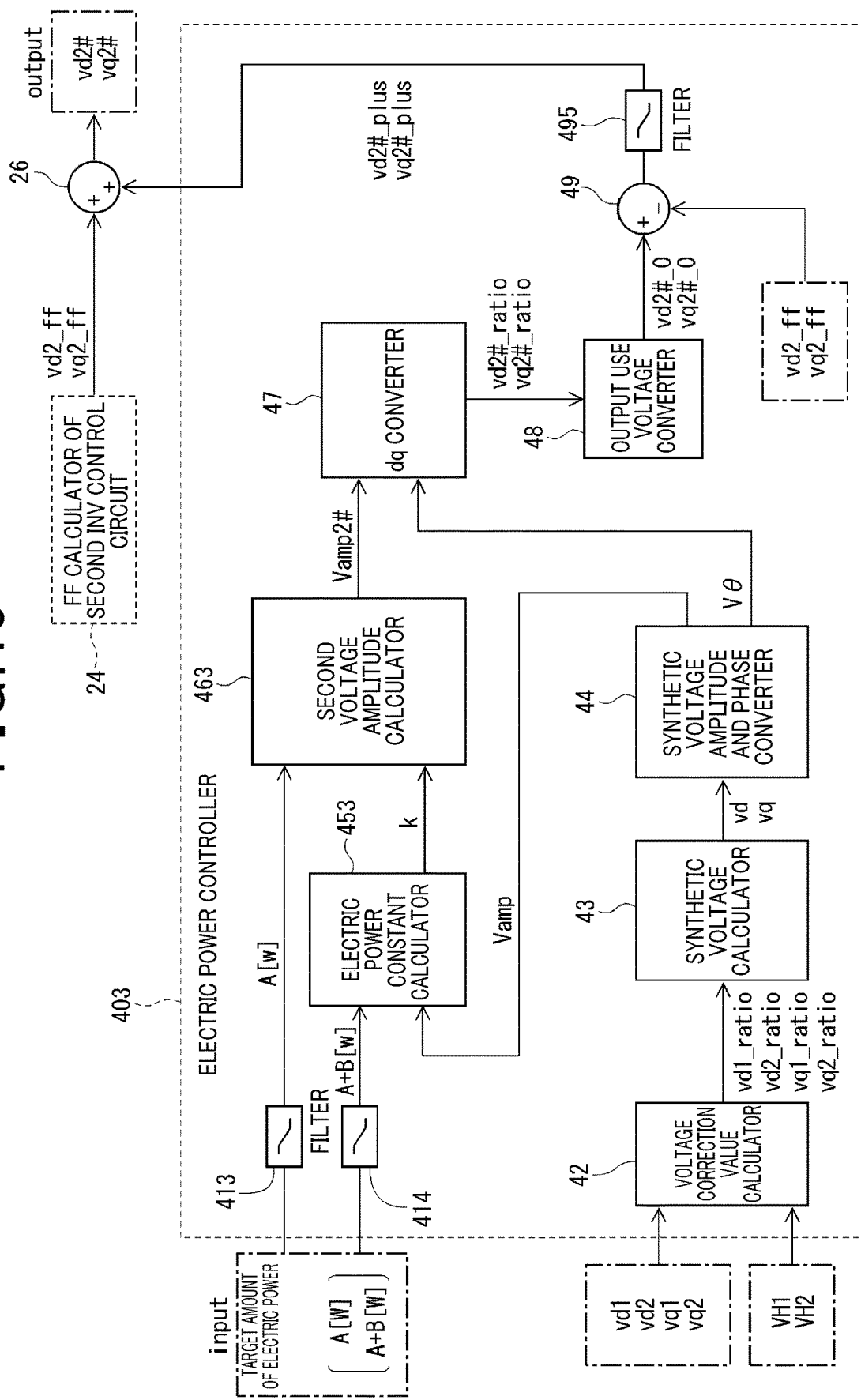
FIG. 10 is a block diagram illustrating an exemplary electric power controller according to a third example of one embodiment of the present invention.

Now, a configuration of a third exemplary electric power controller 403 is described as yet another modification of the present invention with reference to FIG. 10. In this example, as the electric power target instruction, both of a total target amount of electric power collectively targeted by a pair of first and second inverters 60 and 70, and a target amount of electric power targeted by the first inverter 60 located on the electric power non-supervising circuit side are input to the electric power controller 403. Similar to the second example, since the third example conducts addition and subtraction of an amount of electric power itself, calculation errors are not accumulated, thereby more effectively stabilizing sharing performance when compared to the first example.

Specifically, in the third example, the electric power controller 403 calculates an amount of electric power targeted by the second inverter 70 based on dq-axes voltages by using the electric power formula so that the amount of electric power used in the second inverter 70 follows an amount of electric power calculated by subtracting the target amount of electric power of the first inverter 60 from the total target amount of electric power. However, dq-axes currents are not utilized in this example. Subsequently, the electric power controller 403 calculates voltage amplitude that fills in deviation from an amount of electric power before sharing, thereby determining dq-axes voltage instructions capable of generating an amount of electric power corresponding to the electric power instruction.

More specifically, in this example, as the electric power target instruction, a total target amount of electric power (A+B)[W] targeted by the first and second inverters 60 and 70 and a target amount of electric power A[W] targeted by the first inverter 60 are input to the electric power controller 403. The total target amount of electric power (A+B)[W] and the target amount of electric power A[W] are subsequently processed by a pair of filters 413 and 414, respectively, to either suppress or reduce impacts of sudden changes. After completing the applicable filtering process, the target amount of electric power A[W] is input to a second voltage amplitude calculator 463 provided in the electric power controller 403 for electric power use. The total target amount of electric power (A+B)[W] completing the filtering process is input to an electric power constant calculator 453 also provided in the electric power controller 403.

A voltage correction value calculator 42 and a synthetic voltage calculator 43 are also provided in the electric power controller 403 and have substantially the same configurations as those of the second example, respectively. Hence, similar operations are thereby conducted in this example as in the second example. A synthetic voltage amplitude and phase converter 44 also provided in the electric power controller 403 converts dq-axes synthetic voltages vd and vq into a synthetic voltage amplitude Vamp having a synthetic voltage phase V$\theta$ defined with reference to the q-axis by using the below described thirteenth formula. The synthetic voltage amplitude Vamp is subsequently output to the electric power constant calculator 453. The synthetic voltage phase V$\theta$ is also output to a dq converter 47 also provided in the electric power controller 403.

$$Vamp = \sqrt{vd^2 + vq^2}$$ (Thirteenth Formula)

$$V\theta = \tan^{-1}\left(\frac{-vd}{vq}\right)$$

When phases Vθ of the first and second voltage instruction vectors are aligned with each other, the total target amount of electric power (A+B)[W] is proportional to the synthetic voltage amplitude Vamp. Based on this principle, the electric power constant calculator 453 calculates an electric power constant k by dividing the total target amount of electric power (A+B) [W] by the synthetic voltage amplitude Vamp by using the below described fourteenth formula. The electric power constant calculator 453 subsequently outputs the electric power constant k to the second voltage amplitude calculator 463.

$$k = \frac{A+B}{Vamp}$$ (Fourteenth Formula)

The second voltage amplitude calculator 463 calculates a first voltage amplitude Vamp1 by dividing the target amount of electric power A[W] targeted by the first inverter 60 by the electric power constant k. The second voltage amplitude calculator 463 further calculates an electric power post sharing second voltage amplitude Vamp2 # by subtracting the first voltage amplitude Vamp1 from the synthetic voltage amplitude Vamp by using the below described fifteenth formula. A dq converter 47 and other units provided in this example have substantially the same configurations and functions as those in the second example. Hence, similar operations are conducted here as in the electric power controller 403.

$$Vamp2\# = Vamp - Vamp1 = Vamp - \frac{A}{k}$$ (Fifteenth Formula)

As described heretofore, according to the various modifications of the first to third examples, the second inverter control circuit 202 includes one of the electric power controllers 401, 402 and 403 that controls sharing of electric power supplied from the pair of electric power supplies 11 and 12 to the pair of first and second inverters 60 and 70 in accordance with the electric power target instruction respectively. Hence, since, a sharing amount of electric power generated in the pair of electric power supplies is controlled by the one of the electric power controllers 401, 402 and 403 such that electric power used between the pair of electric power supplies is adjusted, the SOC and the voltages of the electric power supplies can be supervised. Accordingly, the SOC can be preferably maintained while either preventing or reducing degradation of the battery in applicable one of the electric power supplies.

Now, yet other modifications of the present invention are herein below described. First, as described heretofore, each of the electric power controllers 401, 402 and 403 of the modifications controls sharing of electric power only by adjusting amplitudes of the first and second voltage instruction vectors while equalizing phases of these first and second voltage instruction vectors with each other. However, as yet another modification, the phases of the first and second voltage instruction vectors may also be adjusted in addition to the amplitudes of these vectors.

Further, in the above-described modifications, only one of the pair of inverter control circuits 201 and 202 includes the electric power controller 40 to act as the electric power supervising circuit, while the other one of the pair of inverter control circuits 201 and 202 excludes the electric power controller 40 to act as the electric power non-supervising circuit. Then, the electric power non-supervising circuit conducts feedback control to upgrade disturbance suppression performance and controls an actual torque to follow an instruction appropriately. However, in yet another modification, both of the inverter control circuits 201 and 202 may employ the electric power controllers 401, 402 or 403 and control electric power of corresponding inverters 60 or 70 while conducting feed-forward control operations, respectively, as long as a system does not call for the disturbance suppression performance. Otherwise, both of the inverter control circuits 201 and 202 may perform feedback control operations, respectively, as long as a system is not impacted by control interference.

In yet another modification, when a system separately employs a pair of independent electric power supplies, these electric power supplies do not necessarily employ the same secondary batteries, such as batteries, capacitors, etc. For example, one of the electric power supplies may be the secondary battery and the other one of the electric power supplies may be either a fuel cell or an electric power generator and the like as well.

In yet another modification, the number of phases of the open windings of the electric motor is not limited to three, and four or more phases can be employed. Also, open windings having two phases may be employed and are connected in a bridge form as well.

In yet another modification, an electric motor driving system of the so-called dual electric power supply and dual inverter system is applied to a pure electric motor car, such as an electric motor car, a fuel-cell car, etc., and an electrically rich hybrid power train, such as a plug-in hybrid (PHV), a range extender, etc. The electric motor driving system of the so-called dual electric power supply and dual inverter system is also applied to a light electric vehicle, such as an integrated starter generator (ISG) generating from about 12 volt to about 48 volt, etc. This technology is established based on a voltage type circuit topology that is applicable to a prescribed use that needs a highly efficiently generated high output without using a conventional technology of a booster circuit with a reactor. Hence, the technology is suitable in various portions of various cars, which demands the high output hardly obtained by the conventional booster circuit due to a heat problem.

Numerous additional modifications and variations of the present disclosure are possible in light of the above teachings. It is therefore to be understood that within the scope of the appended claims, the present disclosure may be executed otherwise than as specifically described herein. For example, the electric motor driving system is not limited to the above-described various embodiments and may be altered as appropriate. Similarly, the electric motor driving method is not limited to the above-described various embodiments and may be altered as appropriate.

What is claimed is:

1. An electric motor driving system to control driving of a motor that includes multiple windings of two or more phases each having open ends, the electric motor driving system comprising:

a first inverter connected to a first power supply at a first end of the first inverter to receive a direct current power from the first power supply, the first inverter including at least two switching elements connected to the open ends of the windings at a second end of the first inverter, respectively;

a second inverter connected to a second power supply at a first end of the second inverter to receive a direct current power from the second power supply, the second inverter including at least two switching elements connected to the open ends of the windings at a second end of the second inverter, respectively; and a main control unit including:
- a first inverter control circuit to receive a torque instruction from an outside of the electric motor driving system and generate a first voltage instruction based on the torque instruction, the first voltage instruction being output to the first inverter,
- a second inverter control circuit to receive a torque instruction from an outside of the electric motor driving system and generate a second voltage instruction based on the torque instruction, the second voltage instruction being output to the second inverter, and
- an electric power controller included in at least one of the first inverter control circuit and the second inverter control circuit to receive a target electric power instruction from an outside of the electric motor driving system, wherein the electric motor system controls a current vector of each of the first and second inverters to be common, the current vector being composed of a current amplitude and a current phase, wherein the electric power controller changes voltage vectors of the first and second inverters while maintaining the sum of the voltage vectors and a total electric power generated in the first and second inverters per torque instruction to control sharing of the electric power supplied from the first power supply and the second power supply between the first inverter and the second inverter in accordance with the target electric power instruction, wherein one of the first inverter control circuit and the second inverter control circuit including the electric power controller acts as an electric power supervising circuit and the other one of the first inverter control circuit and the second inverter control circuit excluding the electric power controller acts as an electric power non-supervising circuit, wherein each of the first inverter control circuit and the second inverter control circuit generates dq-axes voltage instructions based on the torque instruction to respectively control the first and second inverters, and wherein the electric power controller included in the inverter control circuit acting as the electric power supervising circuit adjusts only the dq-axes voltage instructions generated in the electric power supervising circuit based on the dq-axes voltage instructions generated in each of the first inverter control circuit and the second inverter control circuit.

2. The electric motor driving system as claimed in claim 1, wherein the electric power supervising circuit generates the dq-axes voltage instructions by conducting feed-forward control by calculating a prescribed calculation formula and the electric power non-supervising circuit generates the dq-axes voltage instructions by conducting feedback control based on an output of the motor.

3. The electric motor driving system as claimed in claim 1, wherein the target electric power instruction includes a ratio between electric power target amounts targeted by the first inverter and the second inverter, respectively,
wherein the electric power controller adjusts the dq-axes voltage instructions generated in the electric power supervising circuit in accordance with the ratio.

4. The electric motor driving system as claimed in claim 1, wherein the target electric power instruction includes a target amount of electric power targeted by one of the first inverter and the second inverter when the one of the first inverter and the second inverter is controlled by the electric power supervising circuit,
wherein the electric power controller adjusts the dq-axes voltage instructions generated in the electric power supervising circuit in accordance with the target amount of electric power.

5. The electric motor driving system as claimed in claim 1, wherein the target electric power instruction includes both of the sum of target amounts of electric power targeted by the first inverter and the second inverter and a target amount of electric power targeted by one of the first inverter and the second inverter controlled by the electric power non-supervising circuit,
wherein the electric power controller adjusts the dq-axes voltage instructions generated in the electric power supervising circuit in accordance with the sum of the target amounts of electric power and the target amount.

6. A method of driving an electric motor that includes multiple windings of two or more phases each having open ends connected to first and second electric power supplies via first and second inverters, respectively, the method comprising the steps of:
- receiving a torque instruction;
- receiving a target electric power instruction indicating target amounts of electric power targeted by the first inverter and the second inverter, respectively;
- generating a first voltage instruction including a dq axes voltage instruction to control the first inverter based on the torque instruction by conducting feedback control based on an output of a motor generator;
- generating a second voltage instruction including a dq axes voltage instruction to control the second inverter based on the torque instruction by conducting feed-forward control by calculating a prescribed calculation formula;
- calculating a value of adjustment of the second voltage instruction based on the target electric power instruction, the first voltage instruction, and the second voltage instruction;
- controlling the second inverter based on the sum of the second voltage instruction and the value of adjustment of the second voltage instruction; and
- in response to a change in electric power of the second inverter to a prescribed level after performing the feed-forward control, executing feedback control on the first voltage instruction to generate electric power in the first inverter, thereby allocating electric power of the first and second electric power supplies to the first inverter and the second inverter and preventing depletion of a state of charge (SOC) in an applicable one of the first and second electric power supplies while rendering an actual torque following the torque instruction.

* * * * *